(Model.)

S. W. PEREGRINE.
GUARD FOR COLLAR SET SCREWS.

No. 540,558. Patented June 4, 1895.

WITNESSES
Christopher Nondelink
M. Louise Wright.

INVENTOR
Seymour W. Peregrine
By Edward Taggart
His —ATTORNEY

UNITED STATES PATENT OFFICE.

SEYMOUR W. PEREGRINE, OF GRAND RAPIDS, MICHIGAN, ASSIGNOR OF ONE-HALF TO DANIEL W. TOWER, OF SAME PLACE.

GUARD FOR COLLAR SET-SCREWS.

SPECIFICATION forming part of Letters Patent No. 540,558, dated June 4, 1895.

Application filed March 24, 1894. Serial No. 504,963. (Model.)

*To all whom it may concern:*

Be it known that I, SEYMOUR W. PEREGRINE, a citizen of the United States, residing at the city of Grand Rapids, in the county of Kent and State of Michigan, have invented a certain new and useful Guard for Collar Set-Screws, of which the following is a specification.

This invention relates to a new and improved guard for collar set-screws, in which the guard surrounds the collar covering the set-screw so as to inclose the same and prevent the set-screw or the head of the set-screw from coming in contact with the operatives attending to the machinery, and the object of my invention is to provide a guard adapted to surround the collar and cover the set screw, and which shall be capable of being applied to collars of varying diameters within certain limits. These objects I accomplish by means of the devices illustrated in the accompanying drawings, in which—

Figure 1:
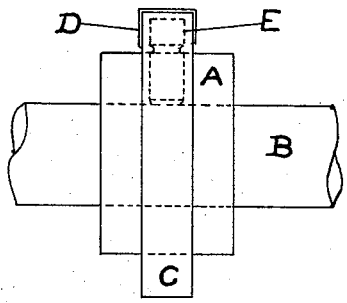
Figure 2:
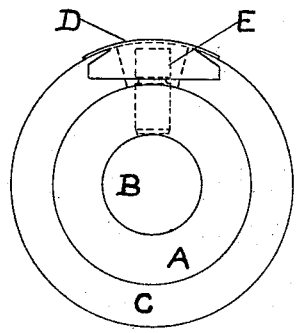
Figure 3:
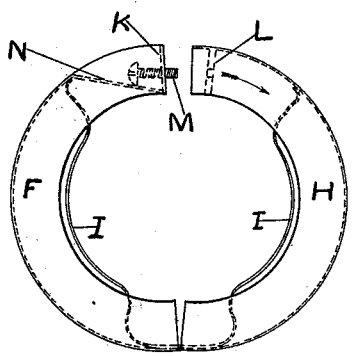
Figure 4:
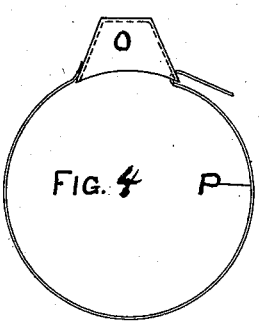
Figure 5:
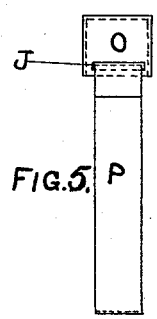
Figure 6:
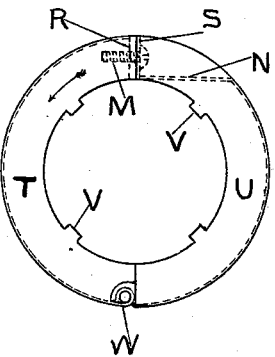
Figure 7:
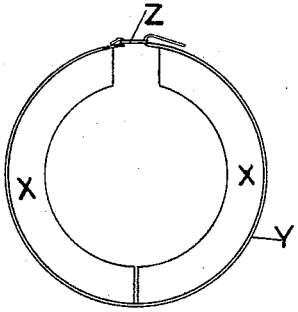

Figure 1 shows a side elevation of my preferred form of guard, with dotted lines showing the position of the set-screw within the guard. Fig. 2 shows an end view with a coupling for the guard. Fig. 3 shows a modified form, in which the guard is made circular and attached together and provided with springs for the purpose of adjusting same to collars of various dimensions, the springs being necessary inasmuch as the collars vary considerably in size. Fig. 4 shows still another modified form, in which the guard proper covers the set-screw and is attached to the collar by means of a band of metal or other material. Fig. 5 shows an edge view of the form illustrated in Fig. 4. Figs. 6 and 7 show modified forms of construction, in which the guard is substantially of circular form.

Similar letters refer to similar parts throughout the several views.

B. represents a shaft of the ordinary construction.

A represents the collar placed upon the shaft adjusted and held in position by means of the set-screw E, the head of which projects above or beyond the periphery of the collar A.

C represents the guard which is preferably made from some elastic material, bent so as to fit closely around the collar, with the ends separated a short distance so as to leave a space for the head of the set-screw. This is shown more fully in Fig. 2. The part C, being bent around, is then clasped or fastened together by means of a metallic piece shown by D, which engages the proximate ends of the strip C, for securing said strip C in a circular form upon the collar, and completing, as it were, the circle, as shown in Fig. 2. Instead of the metallic clasping piece D, any other suitable means for attaching the ends may be used, which will leave a smooth periphery, and side, which will not be likely to engage with or catch the clothing of any person coming in contact therewith.

The strip C, which forms the guard, may be made of rubber, cotton packing, or any other flexible material when my guard is constructed as illustrated in Figs. 1 and 2.

The construction shown in Figs. 1 and 2 is my preferred form. The guard however may be made in various forms—for instance, in the form shown in Fig. 3, in which the semicircles H and F are made of metal and are attached together by means of the screw M, passing through the partition K, and engaging with the partition L, and in order to retain this form of guard upon the collar, I provide springs I—I constructed substantially as shown in Fig. 3.

In the form of device shown in Fig. 4, the reference letter O designates the guard proper which covers the set-screw. This form can be easily applied, as the flexible band P, may be permanently attached at one end to the guard O, and pass through a slot J, in the other end and bent over so as to secure the guard in proper position, it being understood that O covers and conceals the head of the set-screw. The sides of O should be inclined so as to prevent them from engaging with clothing or other similar material.

In the form shown in Fig. 6, the set-screw rests between the sides of the cylindrical guard, the guard being fastened together by means of the cap-screw M as in Fig. 3, passing through sections R and S. This form of guard is made in two sections T and U, and hinged together at W, and provided with projections V—V, &c., which come in contact with the collar.

A very cheap and effective form may be constructed as shown in Fig. 7, in which the sections X and X are solid and are surrounded by a band Y, the opening between the ends being sufficient for the head of the set-screw, the opening being shown at the top of Fig. 7, and the whole attached together by the band at Z, as shown.

It will be observed that in each of the different forms illustrated the guard is capable of being expanded within certain limits to permit of the same being applied to collars of a greater diameter than those illustrated. Thus, in the guard shown in Figs. 1 and 2, the elastic band C being flexible the same will adapt itself to a collar of any size, the size being only limited by the length of the coupling D. In the form shown in Figs. 3 and 6 the diameter of the guard is regulated by means of a set screw R, the adjustment of the guard shown in Fig. 3 being further regulated by the springs I, I, while the guards shown in Figs. 4 and 7 are capable of being applied to collars of almost any diameter, the size being only limited by the length of the bands P and Y.

Having thus described my invention, what I claim to have invented, and desire to secure by Letters Patent, is—

1. The combination with the collar and set screw adapted to attach the same to a shaft, of an expansible guard fitted to encircle the periphery of said collar and inclosing the set screw, and means for adjustably securing together the ends of said guard, substantially as described.

2. A cover for collar set screws, comprising a flexible guard adapted to encircle the collar and embrace between its ends the set screw, and a clamp for adjustably connecting said ends, substantially as described.

In witness whereof I have hereunto set my hand and seal in the presence of two witnesses.

SEYMOUR W. PEREGRINE. [L. S.]

Witnesses:
EDWARD TAGGART,
CHRISTOPHER HONDELINK.